(12) United States Patent
Polyanskiy

(10) Patent No.: US 10,817,831 B1
(45) Date of Patent: Oct. 27, 2020

(54) SCALING INVENTORY MANAGEMENT SYSTEMS

(71) Applicant: Amazon Technologies, Inc., Seattle, WA (US)

(72) Inventor: Ruslan Anatolyevich Polyanskiy, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1266 days.

(21) Appl. No.: 15/068,295

(22) Filed: Mar. 11, 2016

(51) Int. Cl.
*G06Q 10/08* (2012.01)
*G06F 16/951* (2019.01)
*G06Q 10/02* (2012.01)

(52) U.S. Cl.
CPC ......... *G06Q 10/087* (2013.01); *G06F 16/951* (2019.01); *G06Q 10/02* (2013.01)

(58) Field of Classification Search
CPC .............................. G06Q 10/087; G06F 16/951
USPC .............................................................. 705/5
See application file for complete search history.

(56) References Cited

U.S. PATENT DOCUMENTS

| | | | | |
|---|---|---|---|---|
| 2007/0016486 A1* | 1/2007 | Stone | ...................... | G06Q 10/00 705/26.35 |
| 2007/0179819 A1* | 8/2007 | Bradley | .................. | G06Q 10/02 705/5 |
| 2010/0049556 A1* | 2/2010 | Liu | ..................... | G06Q 30/0601 705/5 |
| 2010/0293113 A1* | 11/2010 | Munzer | .................. | G06Q 30/02 705/500 |
| 2012/0078668 A1* | 3/2012 | Hirose | .................... | G06Q 10/02 705/5 |
| 2017/0178221 A1* | 6/2017 | McCorry | ............... | G06Q 10/02 |

OTHER PUBLICATIONS

Sutanto, Yusuf; Inventory Management Optimization Model with Database Synchronization through Internet Network (A Simulation Study); The 5th International Conference on Electrical Engineering and Informatics 2015; Aug. 10-11, 2015, Bali, Indonesia (Year: 2015).*

* cited by examiner

*Primary Examiner* — Kevin H Flynn
*Assistant Examiner* — Dione N. Simpson
(74) *Attorney, Agent, or Firm* — Lee & Hayes, P.C.

(57) ABSTRACT

This disclosure is directed to methods, apparatuses, and systems for scaling inventory management systems to accommodate peak capacity loads. For example, some high-demand, high-volume inventory can provided in a limited time period, attracting network traffic that can overwhelm third party providers with limited network or processing capacity. An inventory database at the third party provider can be mirrored at the service provider, such that the inventory database can be copied to the service provider and stored as a mirror database. User requests can be made against the mirror database at the service provider. The user can select inventory to order, which can reserve the inventory until payment information is provided and confirmed at the service provider. Subsequently, the service provider can synchronize the order with the third party provider in accordance with the limited capacity of the third party provider.

20 Claims, 7 Drawing Sheets

SCALING INVENTORY MANAGEMENT SYSTEMS

BACKGROUND

Current inventory management systems can encounter periods of heavy network traffic, which can degrade an ability of the system to process the traffic. Further, long network delays can discourage users from making database queries, resulting in a poor user experience and/or incomplete transactions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
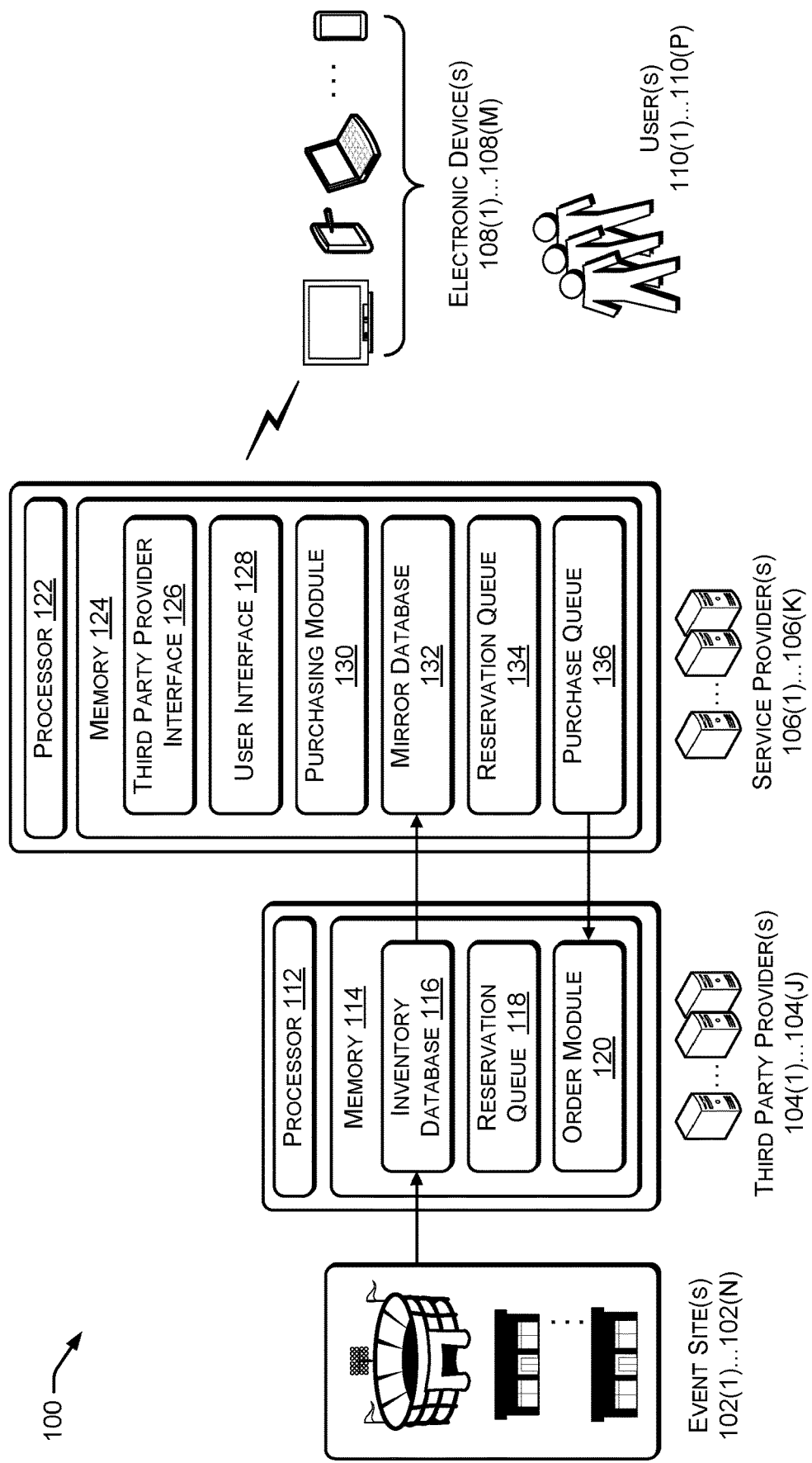
FIG. 1 shows an illustrative inventory management architecture, including event sites, third party providers, service providers, and electronic devices.

This disclosure describes methods, apparatuses, and systems for scaling inventory management systems to accommodate peak capacity loads. For example, a third party provider having limited processing capacity can mirror (e.g., copy or duplicate) an inventory database at a service provider. The service provider can provide a user interface on one or more electronic devices so that users can browse the inventory contained in the mirrored database. The user can select inventory to order and can provide payment information to the service provider. The order can be confirmed by the service provider, after which the service provider can synchronize the order with the third party provider in accordance with the limited processing capacity of the third party provider.

As discussed herein, inventory can include any high-demand, high-volume product (e.g., with limited quantity) provided by a third party provider, which may include tickets to various events such as concerts, theaters, and/or sporting events. Thus, in the case where the inventory is a concert ticket, for example, the inventory database can include information relating to the concert ticket such as site or venue information (e.g., venue size or location, layout, seat maps, etc.), event information (e.g., genre, performer, time, date, etc.), seat information (e.g., section, row, seat numbers, etc.), pricing information, and block information (e.g., whether certain inventory is to be sold as a block).

A third party provider can contract with or otherwise secure rights to sell tickets or access to one or more event sites. The third party provider can store event and ticket information in an inventory database, as discussed above. As the third party provider can have limited network or processing capacity (e.g., a processing capability below an expected peak capacity when tickets go on sale), the third party provider can access a third party provider interface at a service provider to scale up the capacity of the third party provider. Using the third party provider interface, the third party provider can indicate inventory database requirements, network capacity, event information, reservation limits, synchronization capacity, etc. The service provider can access the inventory database at the third party provider and upload, pre-cache, copy, duplicate, or mirror some or all of the database at the service provider. The service provider can promote the inventory or event, and can accept requests for the inventory via a user interface provided to one or more electronic devices associated with users or customers. Because the service provider can have a much higher processing or network capacity than the third party provider, the service provider can process all requests without excessive delay or denying valid requests. After the service provider has begun processing tickets, the service provider can synchronize the mirrored database with the database at the third party provider at the synchronization capacity set by the third party provider. Thus, the third party provider can maintain capacity to perform other related or unrelated processes.

As the service provider receives requests for inventory, the service provider can reserve inventory for a particular user in a reservation queue while the user submits payment information for processing. If a reservation in the reservation queue exceeds the reservation limits (e.g., length of time) defined by the service provider or by the third party provider, the reservation can be extended so that the user can submit payment information, or the reservation can be released so that other users can reserve the inventory for purchase. If the payment processing has been completed and the reservation is active, the order can be confirmed and synchronized with the third party provider database.

In this manner, the methods, apparatuses, and systems described herein improve a functioning of a computing device by reducing a congestion at a third party provider, for example, by providing increased capacity at the service provider. For example, mirroring an inventory database at the service provider during periods of expected peak capacity can reduce a processing load at the third party provider. Further, synchronizing the mirror database and the inventory database at the synchronization rate prevents network congestion at the third party provider. Additionally, the service provider architecture described herein can be applied to a plurality of third party providers, as need and demand grow, thereby allowing greater access to scaling inventory management systems.

The methods, apparatuses, and systems described herein can be implemented in a number of ways. Example implementations are provided below with reference to the following figures.

FIG. 1 shows an illustrative inventory management architecture 100, including event sites 102(1) . . . 102(N), third party providers 104(1) . . . 104(J), service providers 106(1) . . . 106(K), and electronic devices 108(1) . . . 108(M). The architecture 100 also includes users 110(1) . . . 110(P) who can interact with the electronic devices 108(1) . . . 108(M) in a user environment. In some embodiments, the users 110(1) . . . 110(P) can refer instead to a user profile associated with the user 110(1) . . . 110(P) (e.g., if one or more persons interact with a single user profile associated with the electronic devices 108(1) . . . 108(M)).

The event sites 102(1) . . . 102(N) (also referred to as an event site 102) can include any venue such as a stadium, concert hall, theater, movie theater, opera, etc. representing inventory in the architecture 100. For example, the event site 102 can include seats, time slots, rooms, private boxes, etc. for an event held at the event site 102. In some embodiments, the event site 102 can represent any location with limited inventory and/or where reservations are typically made in advance. For example, the event site 102 can represent a registration system for a university, whereby the inventory can include classes in which students can register. In another example, the event site 102 can include a sporting venue, such as a baseball stadium, whereby customers purchase a ticket to watch the game. In another example, the event site 102 can include a sporting event where customers participate, such as a road race (e.g., 5 k run, half-marathon, marathon, etc.). In some embodiments, the event site 102 can represent an entity sponsoring a contest where a high demand is expected. In another embodiment, the event site 102 can include a movie theater including a movie premier, for example, or can include a restaurant associated with a reservation system. In some embodiments, the event site 102 can include camp grounds or trail systems where reservations or permits are required. These and other high-demand, high-volume event sites 102 are contemplated as being within the scope of this disclosure.

The third party providers 104(1) . . . 104(J) (also referred to as a third party provider 104) can be associated with one or more computing devices that can include a processor 112 and a memory 114 comprising an inventory database 116, a reservation queue 118, and an order module 120. In some embodiments, the third party provider 104 can include any entity interfacing with or associated with the event site 102 to provide inventory of the event site 102. For example, the third party provider 104 can contract with individual event sites 102 to allocate some or all of the inventory associated with the event site 102 into the inventory database 116. For example, the inventory database can include information relating to the event site 102 such as site or venue information (e.g., venue size or location, layout, seat maps, etc.), event information (e.g., genre, performer, time, date, etc.), seat information (e.g., section, row, seat numbers, etc.), pricing information, and block information (e.g., whether certain inventory is to be sold as a block). In some embodiments, for example, during periods of low activity, the third party provider 104 can reserve inventory directly from the inventory database 116 (instead of reserving inventory from a mirror database 132, discussed below), and can process reservations in the reservation queue 118, in accordance with embodiments of the disclosure. The order module 120 can finalize orders (e.g., processed at the third party provider 104 or received from the service providers 106(1) . . . 106(K)) and/or can distribute tickets and/or inventory to users after a purchase is completed. In some embodiments, the third party provider 104 can represent a ticket aggregator that interfaces with the event sites 102 to sell tickets at a plurality of event sites 102. For example, the third party provider 104 can contract with the event sites 102 to obtain exclusive or non-exclusive rights to an event (e.g., a concert) at the event site 102. The third party provider 104 can assume the responsibility to promote and advertise for particular events, and can sell tickets (e.g., via the service provider 106) associated with the event before the occurrence of the event. The third party provider 104 can also be responsible for distributing inventory, such as tickets, after the inventory is purchased.

The service providers 106(1) . . . 106(K) (also referred to as a service provider 106) can be associated with one or more computing devices that can include a processor 122 and a memory 124, which stores or otherwise has access to applications and data. The memory 124 can include a third party provider interface 126, a user interface 128, a purchasing module 130, a mirror database 132, a reservation queue 134, and a purchase queue 136. The service provider 106 can communicatively couple to the third party providers 104 and/or the electronic devices 108(1) . . . 108(M) via wired technologies (e.g., wires, USB, fiber optic cable, etc.), wireless technologies (e.g., Wi-Fi, RF, cellular, satellite, Bluetooth, etc.), or other connection technologies. The service provider 106 can utilize any type of communication network, including data and/or voice networks, and can utilize any type of a wired infrastructure (e.g., cable, CATS, fiber optic cable, etc.), a wireless infrastructure (e.g., Wi-Fi, RF, cellular, microwave, satellite, Bluetooth, etc.), and/or other connection technologies. In some embodiments, the service provider 106 can be contracted by the third party provider 104 to promote and advertise events, as well as to provide an interface to users and customers to purchase inventory, such as tickets. For example, the service provider 106 can include superior computing resources (e.g., network and processing capabilities) when compared to the third party provider 104. One example implementation of the service providers 106(1) . . . 106(K) is provided below in more detail with reference to FIG. 3.

The third party provider interface 126 can include an interface for the third party provider 104 to interact with the service provider 106. In some embodiments, the third party provider interface 126 can include a graphical user interface which allows the third party provider 104 to indicate or specify requirements for scaling the inventory database 116. For example, the third party provider 104 can indicate inventory database requirements of the inventory database 116, network capacity, event information, reservation limits, synchronization capacity, etc. The third party provider 104 can schedule when the inventory database 116 can be uploaded or mirrored to the service provider 106, such as during periods of low capacity (e.g., at night, in advance of an event, etc.). In some embodiments, the mirroring of the inventory database 116 to the mirror database 132 can include copying over some or all of the fields in the inventory database 116 to the mirror database 132. For example, the mirror database 132 can include an exact (or substantially exact) copy of the inventory database 116. Thus, at least two copies of the database can exist on different computers, and in some embodiments, the different computers can be at different locations (e.g., the third party provider 104 and the service provider 106). In some embodiments, the third party provider 104 can input or upload market or advertising materials to the service provider 106 to promote or advertise an event. In some embodiments, the third party provider 104 can specify a format or security credentials associated with the inventory database 116 so that service provider 106 can interface with the inventory database 116.

In some embodiments, inventory in the mirror database 132 can supplement inventory associated with an event that the service provider already is offering for sale. For example, in some embodiments, the event sites 102 can contract directly with the service provider 106 and can provide some inventory directly to the service provider 106. In some embodiments, the inventory allocated directly to the service provider 106 inventory can be maintained in the mirror database 132 or in a separate database associated with the service provider 106. Further, the event sites 102 can contract with the third party provider 104, and can provide inventory to the third party provider 104, as discussed herein. Thus, the service provider 106 can use the methods, apparatuses, and systems discussed herein to supplement inventory at the service provider 106 that has been allocated to other, third party providers 104.

The user interface 128 can include a graphical user interface to present on the electronic device 108 to allow the users 110 to browse, view, select, reserve, and purchase inventory associated with the mirror database 132, for example. In some embodiments, the user interface 128 can present a seat map or a map of the venue to the electronic device 108 so that the user 110 can select a particular seat from the mirror database 132. The user interface 128 can also present a graphical user interface allowing the users 110 verify an identity (e.g., to verify that the user 110 is not an automated "bot" or computer program) or to input payment information, in accordance with embodiments of the disclosure.

The purchasing module 130 can receive payment information associated with the users 110 and can verify or confirm the payment information before completing a purchase, for example. In some embodiments, the purchasing module 130 is configured to verify the payment information within the time period associated with the reservation queue 134, for example. That is to say, the purchasing module 130 can be configured to complete a purchase before expiration of the time limit associated with reserving inventory before the inventory is released (e.g., returned) to the mirror database 132, as discussed herein. In some embodiments, a unique expiration time can be associated with individual inventory items as the inventory items are associated with the reservation queue 134 (e.g., a reservation for a first item expires at $T_1$ and a reservation for a second item expires at $T_2$). That is, an expiration time can correspond to an absolute expiration time for each inventory item. In some embodiments, the expiration time is the same for some or all inventory items relating to a particular event (e.g., reservations for a first item and a second item expire 15 minutes after the items are selected or associated with the reservation queue 134). That is, the expiration time can correspond to an amount of time after each item is initially reserved (e.g., 5 minutes, 10 minutes, 15 minutes, etc.).

The mirror database 132 can interface with the inventory database 116 to copy, pre-cache, pre-load, or otherwise mirror some or all of the data in the inventory database 116 at the mirror database 132. For example, the mirror database 132 can mirror the inventory information associated with a particular block of tickets that are to be offered for sale by the service provider 106. In some embodiments, the mirror database 132 can mirror some or all aspects of the inventory database 116. In some embodiments, the mirror database 132 can store {"key", "value"} pairs, whereby the "key" is a seat number (or seat identifier for the event site 102) and the "value" is a seat price associated with the "key."

In some embodiments, after a user 110 selects inventory (e.g., a ticket) to purchase via the user interface 128, the inventory selection is made against the inventory (e.g., tickets available for purchase) stored in the mirror database 132. In some embodiments, the user 110 can select data associated with an inventory item (e.g., in the case of a physical item), while in some embodiments, the user 110 can select an inventory item (e.g., in the case where the item is an access right or reservation associated with an event or location) stored in the mirror database 132. Accordingly, the particular inventory item (or data associated with the inventory item) can be moved or placed in the reservation queue 134 to hold the inventory for a predetermined time limit associated with the reservation. For example, in some embodiments, the reservation queue 134 can hold inventory for 15 minutes and then release (i.e., remove or disassociate) the inventory from the reservation queue 134 back into the mirror database 132 after the reservation expires. In some embodiments, when a user 110 selects a particular inventory item from the mirror database 132, a reservation status or flag is updated in the mirror database 132 while the particular inventory item is allocated to the reservation queue 134.

After purchases are confirmed by the purchasing module 130, inventory can be removed or disassociated from the reservation queue 134 and/or the mirror database 132 and allocated to the purchase queue 136 to be synchronized with the order module 120 of the third party provider 104. In some embodiments, when inventory is purchased, the mirror database 132 is updated to reflect that the inventory is purchased by the user 110 and is no longer available for purchase (e.g., via a purchase status or flag). The purchase queue 136 can further synchronize the completed transactions with the order module 120 at the synchronization rate of the third party provider 104, for example. In some embodiments, the synchronization rate of the third party provider 104 is lower than the rate at which the service provider 106 can receive inventory requests and/or process orders. Thus, the service provider 106 extends the functionality of the third party provider 104 by presenting a higher capacity to receive requests from the electronic device 108 and the users 110, while modulating the synchronization rate when finalizing orders at the third party provider 104. In some embodiments, the synchronization rate can be set via the third party provider interface 126, for example, as a number of orders, requests, and/or transactions per second, which can be below an actual capacity available to the third party provider 104. In some embodiments, the service provider 106 can detect the synchronization rate by increasing a synchronization rate until the service provider 106 receives an error message from the third party provider 104 (e.g., indicating congestion or delay). In this manner, the service provider 106 improves a functioning of the third party provider 104 by acting as a buffer between high-demand and high-volume requests of the users 110, while ensuring a capacity is available at the third party provider 104.

FIGS. 2A, 2B, 5, and 6 illustrate example processes in accordance with embodiments of the disclosure. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media can include non-transitory computer-readable storage media, which can include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 2A:
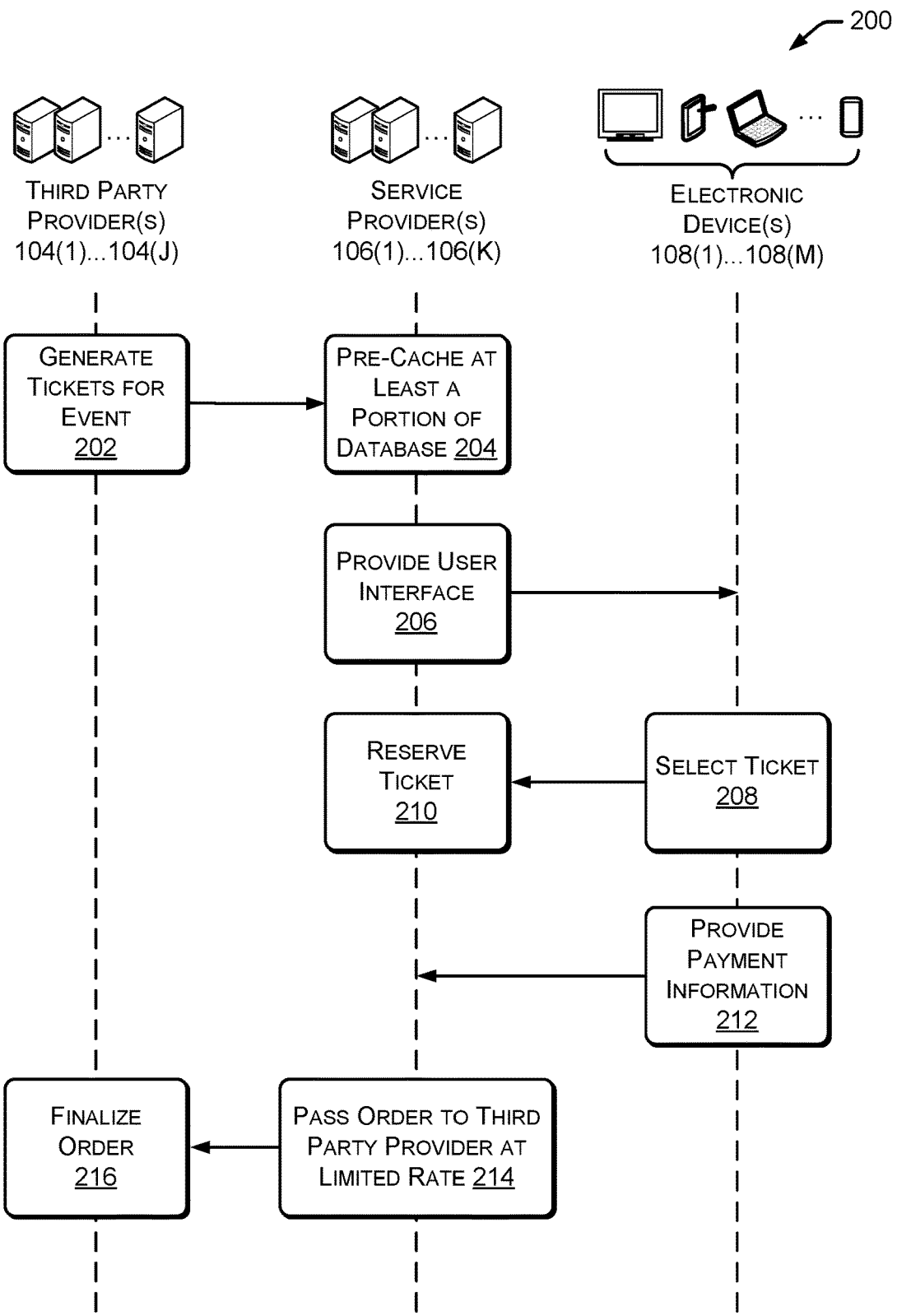
FIG. 2A shows a process for exchanging communications between a third party provider, a service provider, and an electronic device.

FIG. 2A shows a process 200 for exchanging communications between the third party provider 104, the service provider 106, and the electronic device 108. As can be understood in the context of this disclosure, aspects of the process 200 can be performed in parallel between a plurality of the electronic devices 108(1) . . . 108(M) and the service provider 106, and/or between a plurality of third party providers 104(1) . . . 104(J) and the service provider 106. In some embodiments, aspects of the process 200 can include a plurality of the service providers 106(1) . . . 106(K).

At 202, the operation includes generating tickets for an event. For example, the operation 202 can include generating a database listing inventory associated with a particular event at an event site, such as the event site 102. In some embodiments, the operation 202 can include operations performed by the third party provider 104 to contract with the event site 102 to secure the rights to sell inventory associated with the event site 102. In some embodiments, the operation 202 can include populating a database (e.g., such as the inventory database 116) with ticketing and/or site information. For example, the inventory database 116 can include, but is not limited to, information such as site or venue information (e.g., venue size or location, layout, seat maps, etc.), event information (e.g., genre, performer, time, date, etc.), seat information (e.g., section, row, seat numbers, etc.), pricing information, and block information (e.g., whether certain inventory is to be sold as a block).

At 204, the operation includes pre-caching at least a portion of the database at the service provider 106. For example, the operation 204 includes uploading, pre-caching, pre-loading, mirroring, or otherwise transferring some or all of the inventory data from the inventory database 116, for example, to the mirror database 132 at the service provider 106. For example, the service provider 106 can mirror the data structures stored in the inventory database 116. In some embodiments, inventory pre-cached in the operation 204 can be limited to a particular subset of inventory (such as a block of tickets, for example) available to the service provider 106. In some embodiments, the operation 204 can be performed concurrently or in parallel with other operations. That is to say, as a portion of the database is pre-cached at the service provider 106, subsequent operations can be performed to provider a user interface, receive ticket selections, etc.

At 206, the service provider 106 can provide a user interface to one or more of the electronic devices 108. In some embodiments, the operation 206 can be delayed until a period of time until the inventory is made available for purchase. In some embodiments, the user interface is provided by the user interface 128 of the service provider. For example, the operation 206 can include presenting a user interface including a site map, a seat map, pricing information, event information, etc., with user-selectable portions whereby a user 110 can select inventory to reserve, and complete a purchase. In some embodiments, the inventory provided via the user interface can be available inventory that is not reserved by another user. For example, the operation 206 can further include querying the mirror database 132 to determine an available inventory, and presenting the available inventory via the user interface. In some embodiments where the service provider 106 has inventory beyond that stored in the mirror database 132, the operation 206 can include determining whether to provide inventory from the mirror database 132 or another database associated with the service provider 106. As inventory is reserved for a user in accordance with the embodiments, that particular inventory item will not be presented to users in a user interface unless the particular item is released back into the inventory pool reflected in the mirror database 132.

At 208, the operation includes selecting a ticket at the electronic device 108. For example, this operation 208 can include the electronic device 108 browsing the user interface provided in the operation 206 and selecting a particular ticket or block of tickets. Once a selection is made at 208, the electronic device 108 can transmit the selection to the service provider 106.

At 210, in response to receiving the user selection, the operation 210 can include reserving one or more tickets for a user or user profile associated with the electronic device 108. In some embodiments, the ticket is reserved and associated with a particular session, if a user has not yet associated user information with the reservation. In some embodiments, the operation 210 can begin a timer or countdown associated with the reservation so that the ticket or inventory is released if the transaction is not finalized (e.g., the user has not provided payment information to pay for the ticket(s)) before the timer or countdown expires. In some embodiments, this operation can include determining if the item associated with the user selection is still available, or if the item has been reserved by another user. If the item has been reserved, the operation can include presenting an indication via the user interface that the user selection is no longer valid.

At 212, the operation includes providing payment information from the electronic device 108 to the service provider 106. For example, the user associated with the electronic device 108 can input payment information (e.g., credit card information, billing address, etc.) via the user interface provided in the operation 206. As the payment information is provided in the operation 212, the payment information can be transmitted to the service provider 106 (e.g., to the purchasing module 130) and/or to a payment authorization service external to the service provider 130. Provided that a timer or countdown has been initiated in response to the user selecting the ticket(s), receipt of the payment information from the electronic device 108 may end the timer/countdown and may cause the transaction for the ticket(s) to be completed or finalized.

At 214, after the payment information is confirmed at the service provider 106, the operation 214 includes passing the order to the third party provider 104 at a limited rate (e.g., a synchronization rate) associated with the third party provider 104. In some embodiments, the limited rate to pass the order information to the third party provider 104 is set by the third party provider 104 at, near, or below a capacity of the third party provider 104 to process and/or finalize orders. In some embodiments, when additional inventory is managed by the service provider 106 without regard to the third party provider 104, the operation 214 can include determining that the order is to be finalized at the service provider 106, and finalizing an order at the service provider 106.

At 216, the operation includes finalizing the order at the third party provider 104. For example, the operation 216 can include synchronizing the order information with the inventory database 116 to associate customer information with the particular inventory item (e.g., a concert ticket). In some embodiments, the operation 216 can include mailing or shipping purchased inventory to a user, or can include holding the purchased inventory for pickup at the third party provider 104 or at the event site 102.

Figure 2B:
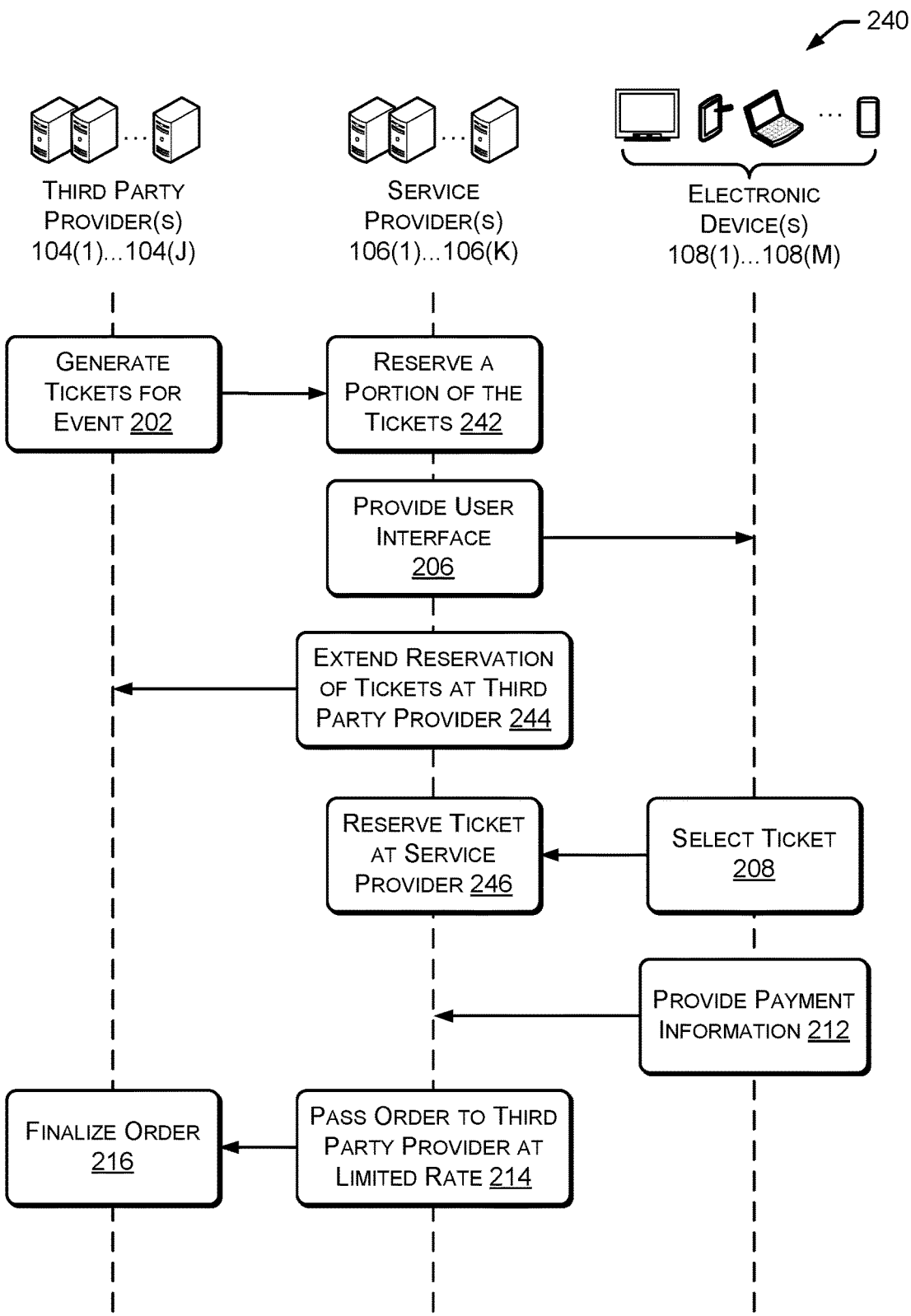
FIG. 2B shows another process for exchanging communications between a third party provider, a service provider, and an electronic device.

FIG. 2B shows another process 240 for exchanging communications between the third party provider 104, the service provider 106, and the electronic device 108. As can be understood in the context of this disclosure, aspects of the process 200 can be performed in parallel between a plurality of the electronic devices 108(1) . . . 108(M) and the service provider 106, and/or between a plurality of third party providers 104(1) . . . 104(J) and the service provider 106. In some embodiments, aspects of the process 200 can include a plurality of the service providers 106(1) . . . 106(K).

At 202, the operation includes generating tickets for an event. This operation is further described above in connection with FIG. 2A.

At 242, the operation includes reserving, at the service provider 106, a portion of the tickets reserved in the operation 242. In some embodiments, the operation 242 can be in addition to or instead of the operation of pre-caching at least a portion of the database in the operation 204 of FIG. 2A. For example, in some embodiments, the service provider 106 can reserve tickets from the third party provider 104 instead of pre-caching the tickets. In some embodiments, the service provider 106 can already have rights to a portion of tickets for an event and may wish to reserve remaining tickets allocated to a third party provider 104 to secure more (or all) of the inventory relating to a particular event. In some embodiments, the operation 242 is performed so that no changes need to be made to processes or routines at the third party provider 104. As can be understood in the context of this discussion, the operation 242 can trigger an operation at the third party provider 104 such that the reserved tickets are associated with a reservation queue (e.g., such as the reservation queue 118 in FIG. 1). Further, the operation 242 can include starting, initiating, or triggering a timer associated with the tickets reserved in the operation 242 such that the reservation can be release upon expiration of the reservation time.

At 206, the operation includes providing a user interface. In some embodiments, the tickets reserved in the operation 242 can be presented via the user interface. This operation is further described above in connection with FIG. 2A.

At 244, the operation includes extending the reservation of tickets at the third party provider. For example, for the portion of tickets reserved in the operation 242, the third party provider 104 and the service provider 106 can monitor an amount of time that the tickets have been reserved. In some embodiments, the service provider 106 can be aware of an amount of time that the tickets can be reserved at the service provider 106 and can extend a reservation of the ticket in the operation 244. For example, this can include providing an indication to the third party provider 104 that the service provider 106 is still offering the tickets for sale. In some embodiments, the operation 244 can be performed while the tickets are made available for sale and before a user selects a ticket for purchase. In some embodiments, the operation 244 can be performed for each block of tickets reserved in the operation 242, and in some embodiments, the operation 244 can be performed when a user selects a ticket for purchase. For example, the operation 244 can be performed a first time when the service provider 106 determines that a ticket reservation is about to expire (e.g., for an individual ticket or for a block of tickets). Subsequently, when a user selects a ticket in the operation 208, for example, the operation 244 can be performed again to extend the reservation an additional time to allow the user to complete a transaction (e.g., by providing payment information in the operation 212, by passing an order to the third party provider 104 at a limited rate in the operation 214, and by finalizing the order in the operation 216). The operations 208, 212, 214, and 216 are discussed above in connection with FIG. 2A.

At 246, in response to a ticket being selected in the operation 208, the operation 246 can include reserving the selected ticket at the service provider 106. For example, the selected ticket can be associated with a reservation queue, such as the reservation queue 134. In some embodiments, as discussed above, the operation 244 can be performed in response to a ticket selected by a user associated with the electronic device 108. That is to say, in some embodiments, when a ticket is selected in the operation 208, the ticket can be associated with a reservation queue 134 at the service provider 106, and a reservation can be extended at the third party provider 104.

Figure 3:
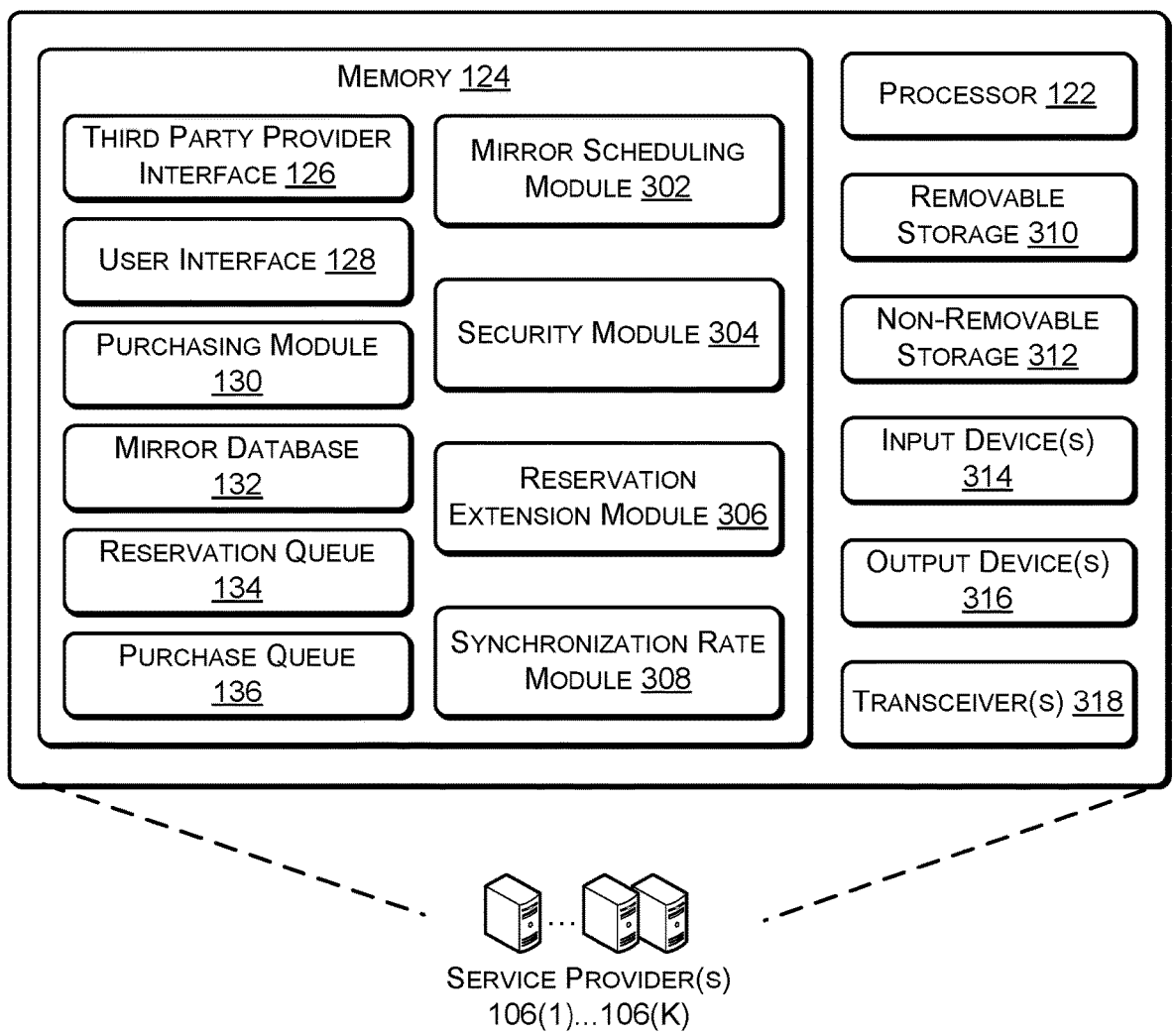
FIG. 3 shows an illustrative service provider for scaling inventory management systems.

FIG. 3 shows an illustrative service provider 300 for scaling inventory management systems. In some embodiments, the service provider 300 can correspond to the service providers 106(1) . . . 106(K) of FIG. 1. It is to be understood in the context of this disclosure that the service provider 300 can be implemented as a single device or as a plurality of devices with modules and data distributed among them. For example, the third party provider interface 126, the user interface 128, the purchasing module 130, the mirror database 132, the reservation queue 134, the purchase queue 136, a mirror scheduling module 302, a security module 304, a reservation extension module 306, and/or a synchronization rate module 308 can be implemented on different devices 300 of the service provider 106.

As illustrated, the service provider 300 comprises a memory 124 storing the third party provider interface 126, the user interface 128, the purchasing module 130, the mirror database 132, the reservation queue 134, the purchase queue 136, the mirror scheduling module 302, the security module 304, the reservation extension module 306, and the synchronization rate module 308. Also, the service provider 300 includes processors 122, a removable storage 310 and non-removable storage 312, input device(s) 314, output device(s) 316, and transceiver(s) 318.

In various embodiments, memory 124 is volatile (such as RAM), nonvolatile (such as ROM, flash memory, etc.) or some combination of the two. The third party provider interface 126, the user interface 128, the purchasing module 130, the mirror database 132, the reservation queue 134, the purchase queue 136, the mirror scheduling module 302, the security module 304, the reservation extension module 306, and the synchronization rate module 308 stored in the memory 124 can comprise methods, threads, processes, applications or any other sort of executable instructions. The third party provider interface 126, the user interface 128, the purchasing module 130, the mirror database 132, the reservation queue 134, the purchase queue 136, the mirror scheduling module 302, the security module 304, the reservation extension module 306, and the synchronization rate module 308 can also include files and databases. Further descriptions of the third party provider interface 126, the user interface 128, the purchasing module 130, the mirror database 132, the reservation queue 134, and the purchase queue 136 are provided above in connection the discussion of FIG. 1.

The mirror scheduling module 302 can schedule when the inventory database 116 is pre-cached, uploaded, mirrored, or otherwise transferred to the mirror database 132. For example, the mirror scheduling module 302 can receive an indication from the third party provider 104 when the mirroring is to be scheduled, such as with an express indication of a start date and time to begin copying the inventory database 116 to the mirror database 132. By way of another example, the third party provider 104 can indicate in a graphical user interface provided by the third party provider interface 126 when an event (e.g., a concert) is to occur and when the associated inventory (e.g., tickets) are to go on sale. The mirror scheduling module 302 can determine that the mirroring is to be performed during periods of low activity for the third party provider 104, such as at night. In some embodiments, the mirror scheduling module 302 can determine a schedule to mirror the inventory database 116 based on a variety of factors, such as the size of the database to be mirrored, the transfer rate of the third party provider 104, when the event associated with the inventory database 116 is to occur, when the inventory is scheduled to be offered for purchase, etc. For example, the mirror scheduling module 302 can start mirroring the database such that the size of the database transferred at the transfer rate of the third party provider 102 can be completed prior to when the inventory is to be made available for purchase. In some embodiments, the mirror scheduling module 302 can provide on-demand or ad-hoc scheduling of the mirror operations.

The security module 304 can provide security to the scaling inventory management system. For example, the security module 304 can provide encryption and/or can use passwords to prevent access to the inventory database 116 and/or the mirror database 132. In some embodiments, the security module 304 can prevent automated "bots" or programs from accessing the system, such as by providing difficult to read text or difficult to discern audio (such as a "CAPTCHA") to determine whether the electronic device 108 interacting with the user interface 128 is a user 110 or is an automated bot or computer program. For example, if the security module 304 determines, based on an interaction with the user interface 128 that a user 110 is not engaging with the service provider 300, the security module 304 can block or otherwise prevent the associated electronic device 108 from purchasing inventory.

The reservation extension module 306 can monitor a time that individual inventory items have been reserved and can determine whether to extend the reservation for the items. For example, a user can reserve an inventory item, which can start the reservation time period, and can submit payment information for the inventory item to the purchasing module 130. If the reservation extension module 306 determines that the reservation for the particular inventory item has expired, the reservation extension module 306 can query the purchasing module 130 to determine if a processing delay was caused by the purchasing module 130. For example, during periods of high volume requests, the purchasing module 130 may lag behind the reservation time associated with inventory items. In some embodiments, if the source of the delay is the purchasing module 130, and not due to inactivity of the user at the user interface 128, the reservation extension module 306 can extend a period of time that an inventory item is to be reserved. In some embodiments, the reservation extension module 306 can track a number of extensions given to each reserved inventory items, and in some embodiments, there can be an upper limit for the number of extensions or a total length of time that a reservation can be extended.

The synchronization rate module 308 can determine a synchronization rate to synchronize orders and/or the mirror database 132 with the third party provider 104. For example, the synchronization rate can be set by the third party provider 104 in the third party interface 126, and/or can be determined by the synchronization rate module 308 by increasing the synchronization rate to the third party provider 104 until the third party provider 104 provides feedback that the synchronization rate above or below a threshold rate. In some embodiments, the synchronization rate is set as a default rate by the synchronization rate module 308. In some embodiments, the synchronization rate module 308 can include maximum rate detection algorithms to determine an optimal synchronization rate. For example, the synchronization rate module 308 can increase a synchronization rate until the third party provider 104 responds with an increased delay (e.g., above an allowable latency), and then the synchronization rate module 308 can implement an exponential back off strategy (for example) to reduce a synchronization rate to the third party provider 104. In some embodiments, the synchronization rate module 308 can increase a synchronization rate until various errors are received (or until a threshold amount of errors are received), such as HTTP type 500 errors.

In some embodiments, the processor 122 is a central processing unit (CPU), a graphics processing unit (GPU), or both CPU and GPU, or other processing unit or component known in the art.

The service provider 300 also includes additional data storage devices (removable and/or non-removable) such as, for example, magnetic disks, optical disks, or tape. Such additional storage is illustrated in FIG. 3 by removable storage 310 and non-removable storage 312. Tangible computer-readable media can include volatile and nonvolatile, removable and non-removable media implemented in any method or technology for storage of information, such as computer readable instructions, data structures, program modules, or other data. Memory 124, removable storage 310, and non-removable storage 312 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the service provider 300. Any such tangible computer-readable media can be part of the service provider 300.

The service provider 300 also can include input device(s) 314, such as a keypad, a cursor control, a touch-sensitive display, voice input device, etc., and output device(s) 316 such as a display, speakers, printers, etc.

As illustrated in FIG. 3, the service provider 300 also includes one or more wired or wireless transceiver(s) 318. For example, the transceiver(s) 318 can include a network interface card (NIC), a network adapter, a LAN adapter, or a physical, virtual, or logical address to connect to the third party providers 104 and/or the electronic device 108, for example. To increase throughput when exchanging wireless data, the transceivers 318 can utilize multiple-input/multiple-output (MIMO) technology. The transceivers 318 can comprise any sort of wireless transceivers capable of engaging in wireless, radio frequency (RF) communication. The transceivers 318 can also include other wireless modems, such as a modem for engaging in Wi-Fi, WiMax, Bluetooth, or infrared communication.

Figure 4:
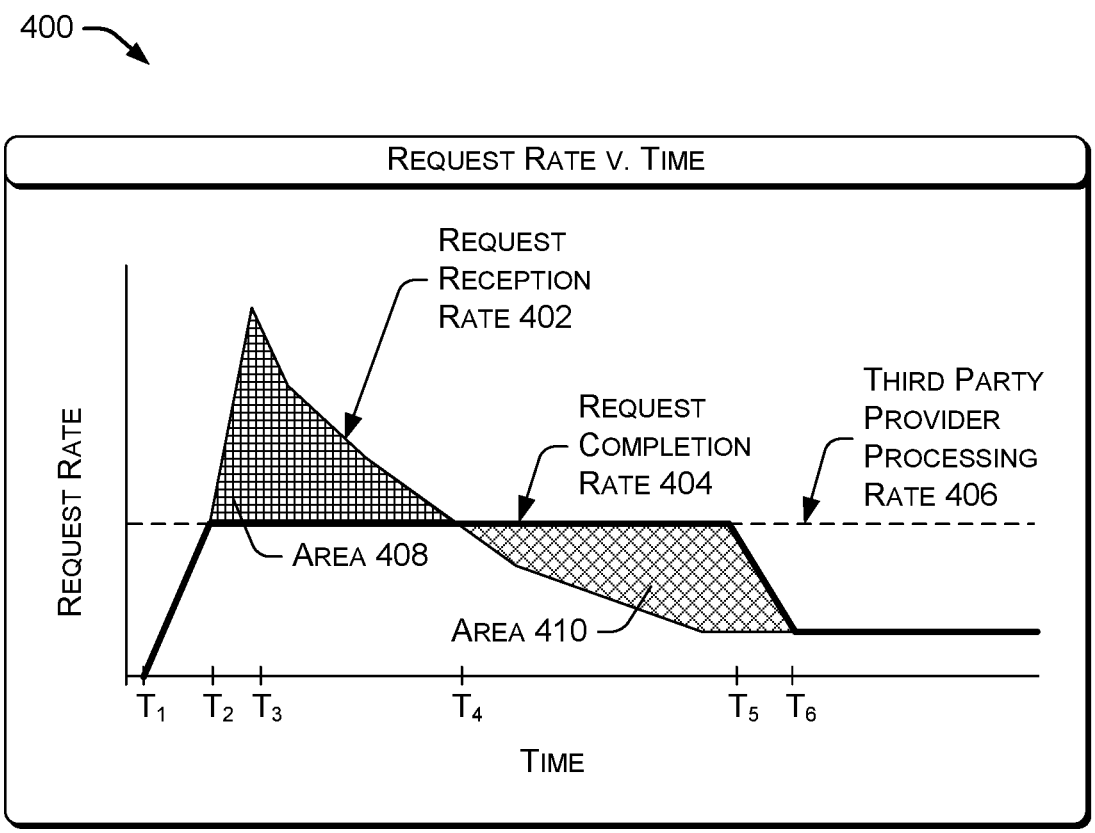
FIG. 4 is a graphic representation of request rate compared to time for an illustrative scalable inventory management system.

FIG. 4 is a graphic representation 400 of request rate compared to time for an illustrative scalable inventory management system. By way of example, and without limitation, a request rate can correspond to a number of requests received per unit time, such as 100 requests per second. Without limitation, the time axis includes times $T_1$, $T_2$, $T_3$, $T_4$, $T_5$, and $T_6$.

In some embodiments, the graphic 400 can illustrate a reception request rate 402 of requests received at the service provider 106, a request completion rate 404 of completed transactions at the third party provider 104, and a third party provider processing rate 406. For example, the third party processing rate 406 can limit the processing rate of requests in the absence of the scalable inventory management system of the present disclosure. In some embodiments, an individual request associated with the request rate 402 can include a database query received from an electronic device, and can include a request to browse or purchase inventory contained in the mirror database 132, for example. In some embodiments, a request associated with the request completion rate 404 can include a request received from the service provider 106 at the third party provider 104, for example, and can reflect a number of completed transactions processed at the third party provider 104, for example.

At $T_1$, an inventory can be made available for purchase. In this example, because the request reception rate 402 is below the third party provider processing rate 406, the reception rate 402 is the same (or nearly the same) as the completion rate 404. That is, the third party provider 104 can complete transactions as they are received by the service provider 106, and therefore, the third party provider 104 completion rate is not a bottleneck at that time because the third party provider 104 can complete transactions as a same rate as transactions are received at the service provider 106. At $T_2$, the request reception rate 402 becomes higher than the third party provider processing rate 406. Thus, the third party provider 104 can process and complete requests at the maximum rate associated with the third party provider 104, even as the request reception rate 402 increases and peaks at $T_3$, and decreases until $T_4$ where the request reception rate 402 falls below the third party provider processing rate 406. Because the service provider 106 includes the mirror database 132, for example, the requests associated with the reception rate 402 can be made against the mirror database 132 at a rate higher than the third party processing rate 406. As described above, as payment processing is completed, the orders are placed into the processing queue 136 and transmitted to the third party provider 104 at the third party provider processing rate 406, which may correspond to the synchronizing rate.

At $T_4$, although the request reception rate 402 falls below the third party provider processing rate 406, because the request reception rate 402 exceeded the request completion rate 404 from $T_2$ to $T_4$, the excess requests can be queued in the purchase queue 136. As the third party provider 104 works through the backlog of orders between $T_4$ and $T_5$, the third party provider 104 and the service provider 106 can synchronize at $T_6$ to receive requests and complete requests at the same rate. In some embodiments, when the request reception rate 402 is higher than the third party provider processing rate 406 (or when there is a backlog of requests because of the high request rate), the service provider 106 can be said to be operating asynchronously from the third party provider 104. After the third party provider works through the backlog and as requests are completed as they are received, the service provider 106 and the third party provider 104 can be said to be operating synchronously.

As illustrated in FIG. 4, an area 408 represents an amount of requests received between $T_2$ and $T_4$ that is above an amount of requests that can be completed at the third party provider processing rate 406. Further, an area 410 represents a backlog of requests between $T_4$ and $T_6$ that can be processed at the third party provider processing rate 406 after the request reception rate 402 drops below the third party provider processing rate 406. For example, in some embodiments, the area 408 and the area 410 can be approximately equal. That is to say, for the requests represented by the area 408 that cannot be processed by the third party provider 104 synchronously, those requests (or volume of requests in a first-in, first-out (FIFO) queue) can be processed by the third party provider 104 at the third party provider processing rate 406 to work through the backlog until the system operates synchronously at $T_6$.

As illustrated by the graphic 400, the methods, apparatuses, and systems discussed herein improve a functioning of the third party provider 104 by accepting requests at a rate higher than the processing rate of the third party provider 104. This reduces a congestion at the third party provider 104 and improves a user experience when making transactions involving high-demand, high-volume, time-sensitive inventories.

Figure 5:
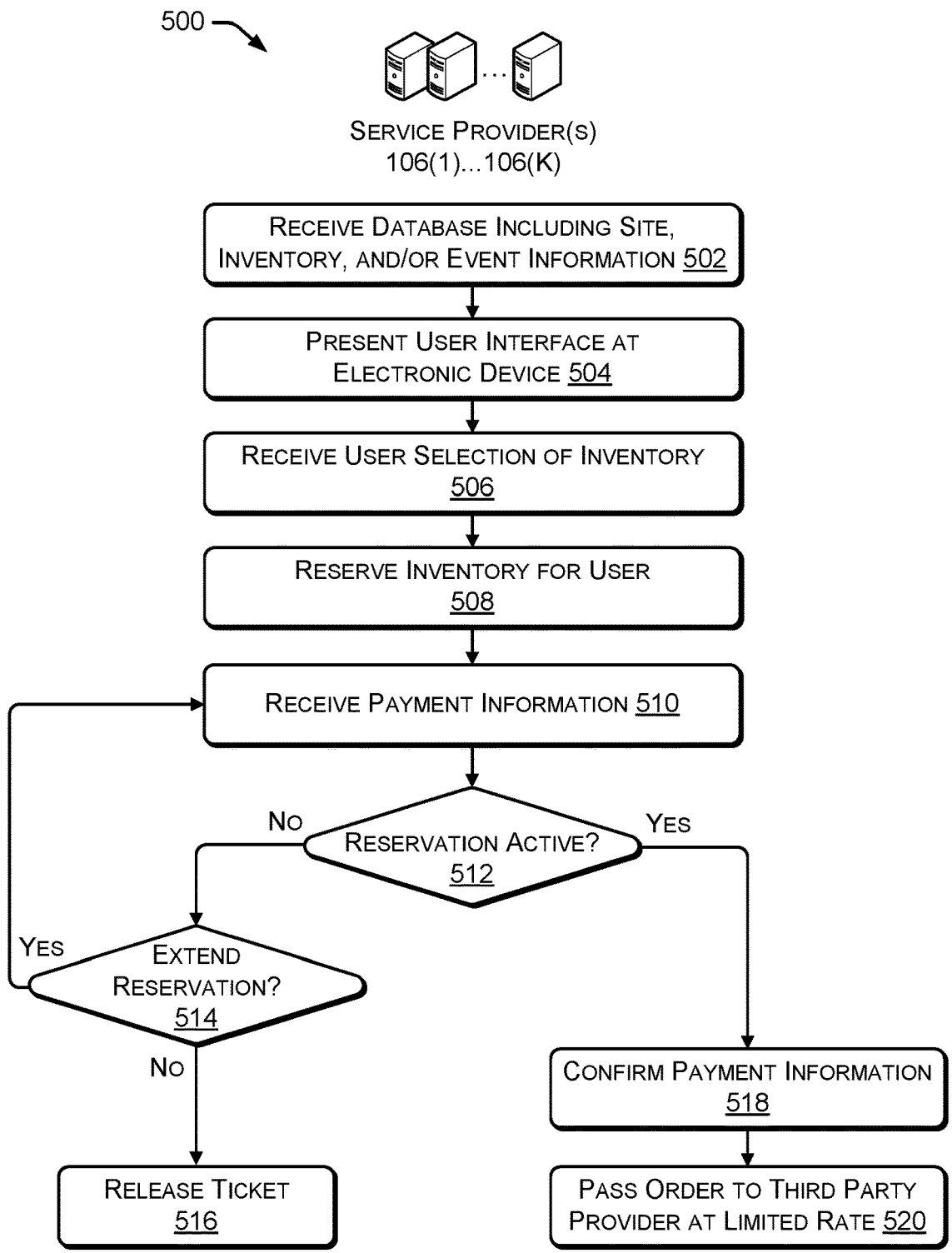
FIG. 5 illustrates a process for conducting a user transaction in an inventory management system, in accordance with embodiments of the disclosure.

FIG. 5 illustrates a process 500 for conducting a user transaction within an inventory management system, in accordance with embodiments of the disclosure. For example, aspects of the process 500 can be performed by the service provider 106, as illustrated in FIG. 1.

At 502, the operation includes receiving a database including site information, inventory information, and/or event information at the service provider 106. For example, this database can be received at the mirror database 132, in response to the third party provider 104 using the third party interface 126 to implement the scaling inventory management methods, apparatuses, and systems discussed herein. In some embodiments, the operation 502 can include receiving some or all of the inventory database 116 from the third party provider 104. In some embodiments, the operation 502 can include receiving discrete blocks of inventory from the third party provider 104 and making the received blocks of inventory available for purchase as they are received in the operation 502 (i.e., without waiting until all the blocks are received). In some embodiments, the inventory received in the operation 502 can supplement inventory associated with the same event already allocated to the service provider 106. In some embodiments, the only a portion of the database need to be received at the service provider 106, while other operations in the process 500 can be performed concurrently or in parallel. Further, in accordance with FIGS. 2A and 2B, the inventory items can be received via pre-caching, uploading, copying, or making reservations against an inventory database of the third party provider 104.

At 504, the operation includes presenting a user interface at the electronic device 108. Further, operation 504 can include delaying the presentation of the user interfaces until a particular time period, such that all available inventory in the mirror database 132 is presented simultaneously to a plurality of electronic devices 108 at a same time. In some embodiments, as mentioned above, as blocks of inventory are received in the operation 502, for example, the received inventory can be made available for purchase, and accordingly, presented via the user interface in the operation 504.

Because of the high-volume, high-demand nature of the disclosure, aspects of the process 500 (such as presenting the user interface at an electronic device) can be occurring tens or hundreds of times per second during peak capacity.

At 506, the operation includes receiving a user selection of inventory. For example, the operation 506 can include browsing, viewing, searching, or navigating within the user interface presented in the operation 504, such that the user can select a specific inventory item (such as a seat at a concert, a block of seats at a sporting event, a class in a university registration system, etc.).

In response to the user selection received in the operation 506, at 508, the operation can include reserving the inventory for the user. In some embodiments, the reservation can be associated with a user, an electronic device, a user profile, or a session associated by the user. This operation 508 can include monitoring an amount of time that the inventory has been reserved. Further, the operation 508 can include determining that the user selection of inventory corresponds to a user, instead of a selection by an automated "bot" or a computer program.

At 510, the operation includes receiving payment information. For example, the user can input payment information such as credit card information, promotional credits, or any payment method associated with making payments via a network. In some embodiments, this operation 510 can include processing the payment information at the purchasing module 130, for example.

At 512, the operation includes determining if the reservation is active. For example, in some embodiments, after the payment information is received, the payment information is verified to reduce a possibility of fraud. In some embodiments, the operation 512 can include determining if a reservation is active at the service provider 106 and/or can include determining if the reservation is active at the third party provider 104 (e.g., in the event that the service provider 106 reserves inventory from the third party provider 104). If the reservation is not active, for example, because a confirmation has not been received (e.g., in the operation 518) or because there was a delay in receiving payment information, the process 500 can move to operation 514. In some embodiments, the operation 514 can determine whether to extend the reservation of inventory in the reservation queue 134, for example, if there is some delay not attributable to the user. In some embodiments, the operation 514 can include extending a reservation of inventory at the third party provider 104. However, in order to ensure that the inventory is made available to users that wish to purchase the inventory, a reservation extension can be denied, and the inventory can be released at operation 516. In some embodiments, releasing the ticket in operation 516 can include making the inventory available to another user 110 or electronic device 108.

At 518, if the reservation is still active, the operation can include receiving confirmation of the payment information. For example, this confirmation can be provided by the purchasing module 130 or a third party merchant verification system.

At 520, the operation includes passing the order to the third party provider 104 at the limited rate, as discussed herein. For example, the order can be allocated to the purchase queue 136 and transmitted synchronously or asynchronously depending on the request reception rate and/or a backlog at the service provider 106 and/or at the third party provider 104 associated with the high-demand, high-volume inventory.

An exemplary implementation of the process 500 is described in the context of concert ticketing. For example, a particular event can include a concert at a concert venue (i.e., an event site 102). A third party provider 104 can contract with the event site 102 to sell some or all of the tickets related to the particular event. Thus, an inventory database 116 at the third party provider 104 can include ticketing information such as seat and price information. Because the third party provider 104 cannot handle an expected volume of browse requests and/or purchase requests expected in connection with the sale period of the tickets, the third party provider 104 can contract with a service provider 106 to market and sell tickets using the resources of the service provider 106, as described herein. The inventory database 116 of the third party provider 104 is mirrored (e.g., copied) to the service provider 106, where the inventory database 116 is received at the service provider 106 as the mirror database 132. In some embodiments, the inventory database 116 can include the site information, inventory information, and event information, such as the concert information including a date, time, and location of the concert, and ticketing information such as seat information (e.g., within a seat map) and pricing associated with the seat.

In some embodiments, the inventory database 116 is copied over to the mirror database 132 before the tickets are to be offered for sale, and the service provider 106 can offer all the tickets for sale simultaneously, triggering a high-demand, high-volume sales event. After the tickets are placed on sale, users 110 can navigate to a website hosted by the service provider 106 to browse the available tickets for purchase. In some embodiments, as the user 110 requests tickets for purchase, this request is processed by the service provider 110 to determine available inventory for sale. In some embodiments, this request is made against the mirror database 132, which tracks the available tickets for purchase. As the user reserves inventory, the inventory is placed in a reservation queue 134, such that the user 110 must complete a transaction associated with the tickets within a predetermined amount of time. After the inventory is placed in the reservation queue 134, the service provider 106 monitors the reservation time to determine if the reservation is active, or to determine if the inventory should be removed from the reservation queue 134 and placed back into the mirror database 132 where the tickets can be again offered for sale. If the user 110 completes the transaction within the predetermined period of time, the tickets can be removed from the reservation queue 134 at the service provider 106, the tickets can be added to or associated with the purchase queue 136, and the transaction information can be provided to the third party provider 104 at the synchronization rate of the third party provider 104.

Figure 6:
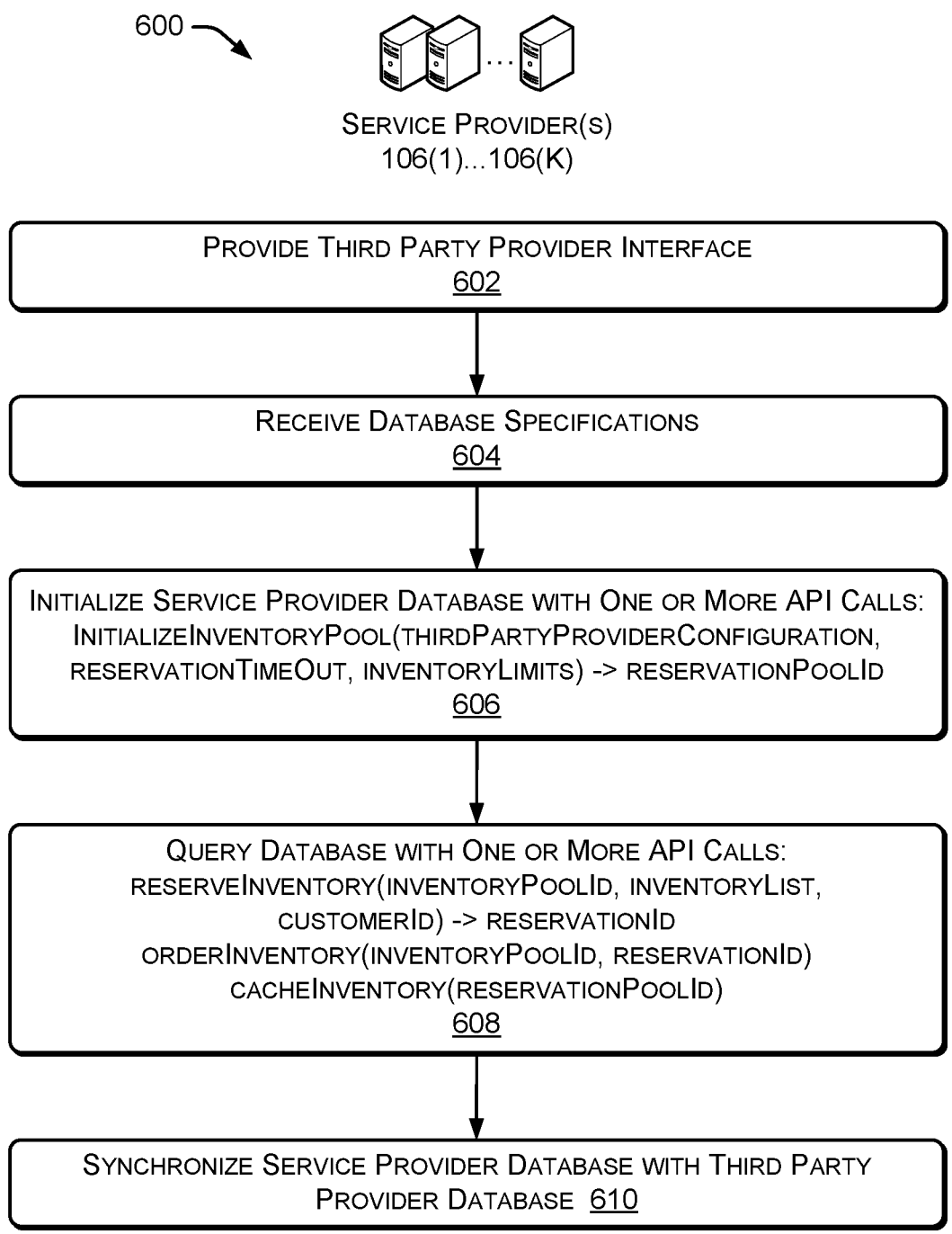
FIG. 6 illustrates a process for receiving, initializing, and synchronizing a database at a service provider.

FIG. 6 illustrates a process 600 for receiving, initializing, and synchronizing a database at a service provider. For example, aspects of the process 600 can be performed by the service provider 106, as illustrated in FIG. 1.

At 602, the operation can include providing a third party provider interface (e.g., the interface 126) to the third party provider 104. The third party provider 104 can input a specification associated with the inventory database 116, for example, and at 604, the service provider 106 can receive the database specification from the third party provider 104. For example, the database specifications can include the fields included in the database, formatting of the database, numbers and/or limits of the data records to be included while mirroring the inventory database 116 at the service provider 106, and/or the transmission rate (e.g., to transfer the inventory database 116 to the service provider and/or to synchronize the mirror database 132 and/or the purchase queue 136 with the third party provider 104) of the third party provider 104.

At 606, the operation can include initializing the service provider database with one or more API (application program interface) calls. For example, the one or more API calls can include initializeInventoryPool(thirdPartyProviderConfiguration, reservationTimeOut, inventoryLimits)→reservationPoolId. For example, the initializeInventoryPool API can utilize the third party provider configuration, which can be provided in the operation 604. In some embodiments, the reservationTimeOut variable can correspond to a length of time that a reservation can be kept before the reservation expires (e.g., 15 minutes). In some embodiments, the inventoryLimits can correspond to database items in the inventory database 116 (e.g., items 1-1000), and can define a range of inventory items that are to be mirrored at the service provider 106. Thus, in some embodiments, the service provider database can be initialized using the APIs described herein.

At 608, the operation can include querying the database cached at the service provider 106 using one or more APIs. For example, the one or more API calls can include reserveInventory(inventoryPoolId, inventoryList, customerId)→reservationId; orderInventory(inventoryPoolId, reservationId); and cacheInventory(reservationPoolId). In accordance with the disclosure herein, the reservations and orders are made against the mirror database 132 at the service provider 106, instead of at the third party provider 104. Thus, using the superior processing capabilities of the service provider 106, the scalable inventory management system can handle a larger volume of traffic with less delay, while synchronizing the mirror database 132 at the service provider with the third party provider 104 at operation 610.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more computer-readable media storing computer-executable instructions that, when executed by the one or more processors, cause the one or more processors to:
receive, from a third party provider and via a communication network, at least one field of an inventory database stored at the third party provider, the at least one field being received as at least one received field;
generate a copy of the inventory database stored at the third party provider as a mirror database including the at least one received field, the mirror database stored at a service provider;
cause presentation of a user interface on an electronic device associated with a user;
receive, via the user interface of the electronic device and via the communication network, a user selection of at least one data item stored in the mirror database, the at least one data item associated with at least one inventory item;
receive payment information corresponding to a price of the at least one inventory item, the price of the at least one inventory item being stored in the mirror database;
associate a user identifier with the at least one inventory item, the user identifier associated with at least one of the electronic device or the user;
transmit an indication of the user identifier and the at least one inventory item to the third party provider;
receive a plurality of requests at a request rate, a request of the plurality of requests associated with a query of the mirror database; and
synchronize the mirror database with the inventory database at a synchronization rate that is less than the request rate.

2. The system of claim 1, wherein the one or more processors are further configured to:
query the mirror database to determine an available inventory for purchase;
present data associated with the available inventory via the user interface presented on the electronic device;
determine that the at least one inventory item is no longer available for purchase; and
update the mirror database to indicate that the at least one inventory item is not available for purchase.

3. The system of claim 1, wherein the one or more processors are further configured to:
determine a time at which inventory associated with the mirror database is to be first available for purchase; and
complete the copy of the inventory database stored at the third party provider as the mirror database prior to the time at which the inventory associated with the mirror database is to be first available for purchase.

4. The system of claim 1, wherein the one or more processors are further configured to:
provide a third party provider interface to the third party provider; and
receive, via the third party provider interface, at least one database specification associated with the inventory database,
wherein the indication indicates a completed transaction for the at least one inventory item.

5. The system of claim 1, wherein the one or more processors are further configured to:
associate the at least one inventory item in a reservation queue at a device associated with the service provider; and
monitor a reservation time of the at least one inventory item in the reservation queue.

6. The system of claim 5, wherein the one or more processors are further configured to:
determine that the reservation time of the at least one inventory item exceeds a reservation expiration time; and
extend the reservation expiration time to an extended reservation expiration time, the extended reservation expiration time uniquely associated with the at least one inventory item.

7. The system of claim 5, wherein the one or more processors are further configured to:
determine that the reservation time of the at least one inventory item exceeds a reservation expiration time; and
remove the at least one inventory item from the reservation queue.

8. The system of claim 1, wherein the indication indicates a completed transaction for the at least one inventory item.

9. The system of claim 1, wherein, to receive the user selection, the one or more processors are further configured to:
receive the user selection of the at least one data item associated with the at least one inventory item; and
hold the at least one inventory item for a predetermined time limit until the payment information is received, based on the user selection of the at least one data item stored in the mirror database,
wherein a number of synchronizations per a unit of time of the mirror database with the inventory database is less than a number of requests received per the unit of time by the mirror database.

10. The system of claim 1, wherein the mirror database further includes inventory information and pricing information for tickets associated with an event at an event site.

11. A method comprising:
receiving, from a third party provider and via a communication network, at least one field of an inventory database stored at the third party provider, the at least one field being received as at least one received field;
generating a copy of the inventory database stored at the third party provider as a mirror database including the at least one received field, the mirror database stored at a service provider;
causing presentation of a user interface on an electronic device associated with a user, the presentation including at least first inventory stored in the mirror database and second inventory stored in another database stored at the service provider;
receiving, via the user interface of the electronic device and via the communication network, a user selection of at least one data item stored in the mirror database, the at least one data item associated with at least one inventory item;
receiving payment information corresponding to a price of the at least one inventory item, the price of the at least one inventory item being stored in the mirror database;
associating a user identifier with the at least one inventory item, the user identifier associated with at least one of the electronic device or the user;
transmitting an indication of the user identifier and the at least one inventory item to the third party provider;
receiving a plurality of requests at a request rate, a request of the plurality of requests associated with a query of the mirror database; and
synchronizing the mirror database with the inventory database at a synchronization rate that is less than the request rate.

12. The method of claim 11, further comprising:
querying the mirror database to determine an available inventory for purchase;
presenting data associated with the available inventory via the user interface presented on the electronic device;
determining that the at least one inventory item is no longer available for purchase; and
updating the mirror database to indicate that the at least one inventory item is not available for purchase.

13. The method of claim 11, further comprising:
determining a time at which inventory associated with the mirror database is to be first available for purchase; and
completing the copy of the inventory database stored at the third party provider as the mirror database prior to the time at which the inventory associated with the mirror database is to be first available for purchase.

14. The method of claim 11, further comprising:
associating the at least one inventory item in a reservation queue at a device associated with the service provider; and
monitoring a reservation time of the at least one inventory item in the reservation queue.

15. The method of claim 14, further comprising:
determining that the reservation time of the at least one inventory item exceeds a reservation expiration time; and
extending the reservation expiration time to an extended reservation expiration time, the extended reservation expiration time uniquely associated with the at least one inventory item.

16. The method of claim 11, wherein the at least one data item stored in the mirror database includes one or more tickets associated with an event at an event site.

17. A device for use in an inventory management system, the device comprising:
one or more processors; and
one or more computer-readable media storing computer-executable instructions that, when executed by the one or more processors, cause the one or more processors to:
receive, from a third party provider, a mirror database, the mirror database including a copy of data stored in an inventory database located at the third party provider, the mirror database further including inventory information and pricing information for tickets associated with an event at an event site;
store the mirror database at the device;
present, at an electronic device associated with a user, a user interface that allows the user to search for one or more tickets of the tickets stored in the mirror database stored at the device;
receive, via the user interface and from the electronic device, a user selection corresponding to at least one ticket of the tickets stored in the mirror database; and
synchronize the mirror database with the inventory database at a synchronization rate that is less than a request rate of a plurality of received requests.

18. The device of claim 17, wherein the one or more processors are further configured to:
associate, in a reservation queue at the device, the at least one ticket with the user, based in part on a determination that a reservation time of the at least one ticket is less than an expiration time; and
transmit an indication of the at least one ticket to the third party provider, based in part on the at least one ticket being associated with the user.

19. The device of claim 17, wherein the one or more processors are further configured to:
determine whether a reservation time of the at least one ticket is greater than an expiration time; and
remove the at least one ticket from a reservation queue based at least in part on the reservation time being determined to be equal to or greater than the expiration time.

20. The device of claim 17, wherein a first number of synchronizations per a unit of time of the mirror database with the inventory database is less than a second number of requests received per the unit of time by the mirror database.

* * * * *